United States Patent Office 2,793,543
Patented May 28, 1957

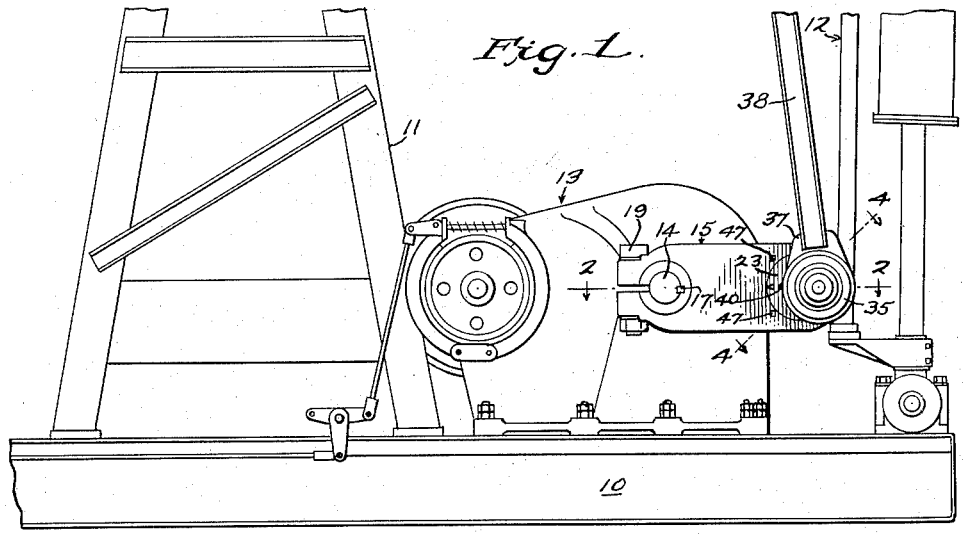
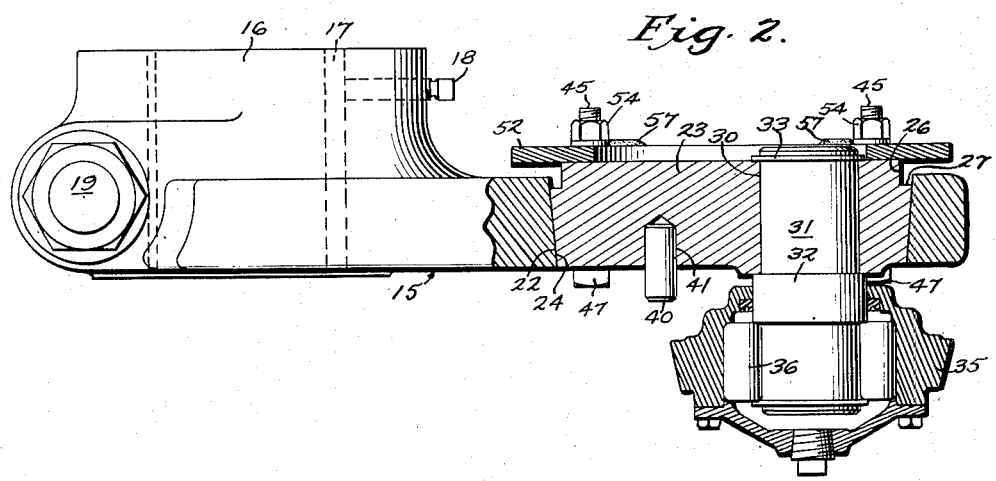
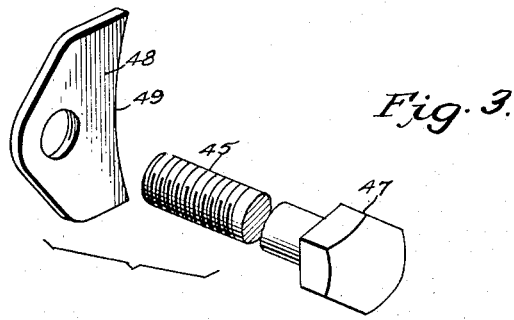
INVENTOR
ROBERT GRIFFIN DE LA MATER
BY John Y. Phillips
ATTORNEY

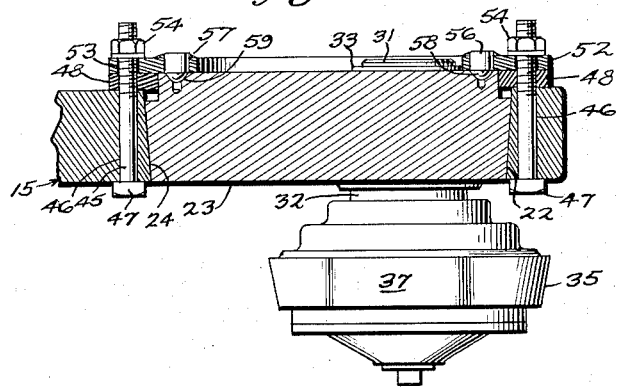
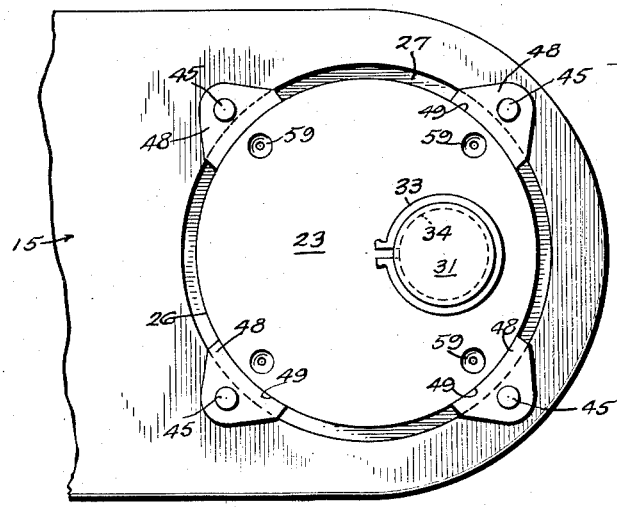
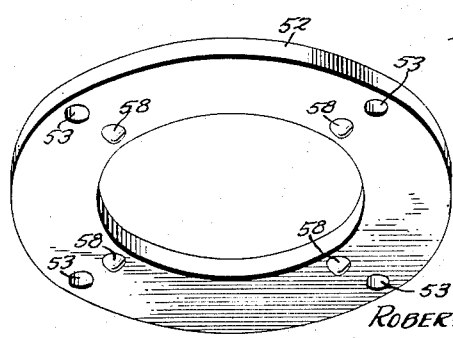

2,793,543

ECCENTRIC WRIST PIN MOUNTING FOR PUMPING UNITS

Robert Griffin De La Mater, Parkersburg, W. Va., assignor to The Parkersburg Rig & Reel Company, Parkersburg, W. Va., a corporation of West Virginia Application November 12, 1952, Serial No. 320,001

14 Claims. (Cl. 74—600)

This invention relates to a wrist pin mounting for pumping units, and more particularly to a structure for mounting at varying distances from the center of rotation of a crank, the wrist pin of each pitman used in conjunction with a conventional walking beam pumping unit.

Prior to the use of so-called "eccentric cranks" in oil well pumping units, it was the common practice to employ crank members each having several wrist pin holes on different radii from the center of the power shaft on which the crank is mounted. These several wrist pin holes were provided for the connection of the wrist pins at selectively different distances from the axis of rotation of the crank to vary the length of the pumping stroke, as is well known. With such structures it is necessary to remove the wrist pin from one hole and install it in another hole to vary the pumping stroke, and this change entails considerable effort. For example, it is necessary to secure the walking beam of the unit to prevent it from falling while both pitmans are disconnected from the cranks. The pins may be driven either into straight tight holes in the crank, or tapered pins may be placed in tapered holes. Where tapered pins are employed, such pins are wedged in place by drawing up on the taper by means of a nut tightened by driving it with a sledge hammer. All such types of pins are removed either by the use of a special puller or by driving against the end of the pin in order to loosen and remove it from a hole in the crank.

An important object of the present invention is to provide a novel and simplified type of eccentric for mechanically connecting a wrist pin to a crank arm, whereby the radius of the wrist pin may be varied quite easily by rotation of the eccentric.

A further object is to provide such a structure wherein, after being connected in position relative to the crank, the eccentric readily may be loosened from the crank and a rotational force applied thereto to rotate it in its opening to vary the distance of the axis of the wrist pin from the axis of rotation of the crank.

A further object is to provide in such a construction a novel cooperation between the eccentric and a retaining means therefor, whereby the eccentric may be loosened for turning while the retaining means prevents substantial displacement of the eccentric from its opening in the crank.

A further object is to provide in such a construction a retaining means and a cooperating clamping plate for the eccentric, both retained in position relative to the crank by common anchoring means, and the clamping plate being capable of being loosened to permit rotation of the eccentric without loosening the retaining means, the latter in effect becoming a permanent part of the construction after being installed.

A further object is to provide novel means cooperating between the clamping plate and the eccentric for positively positioning the latter in pre-selected positions to prevent its being rotated in its opening during the pumping operation.

A further object is to provide such a construction wherein the various parts are highly simplified and economical to manufacture and wherein a different adjustment can be provided in a minimum length of time and with minimum effort, it being unnecessary to secure the walking beam against movement during the adjusting operation.

A further object is to provide such a structure wherein the wrist pin is not removed during the adjusting operation, the wrist pin connection with the eccentric being, in effect, of a permanent nature, and the wrist pin being maintained in position by the simplest possible means capable of employment for this purpose.

Other objects and advantages of the invention will become apparent during the course of the following description.

In the drawings I have shown one embodiment of the invention. In this showing:

Figure 1 is a fragmentary side elevation showing portions of a conventional pumping unit with the present invention applied thereto;

Figure 2 is an enlarged sectional view on line 2—2 of Figure 1, parts being shown in elevation;

Figure 3 is an enlarged detail perspective view of one of the retaining devices, the parts being shown separated;

Figure 4 is an enlarged fragmentary sectional view on line 4—4 of Figure 1, the pitman being omitted;

Figure 5 is an enlarged fragmentary face view of the eccentric end of the crank, the clamping plate and its attaching nuts being omitted; and Figure 6 is an enlarged detail perspective view of the clamping plate looking from the inner face thereof.

In Figure 1 there is fragmentarily illustrated a portion of a generally conventional pumping rig comprising a base assembly 10 on which is mounted a Samson post 11. The Samson post supports at its upper end the usual walking beam (not shown) to the end of which opposite the Samson post is connected the usual compensator head having the pump line connected thereto, these elements also not being shown. In conjunction with the pumping end of the walking beam is preferably associated a counterbalance unit indicated as a whole by the numeral 12. On the base assembly 10 is mounted the usual prime mover (not shown) connected to drive a conventional reducing gearing 13 having an output shaft 14 to which is connected a pair of cranks one of which is illustrated and has been indicated as a whole by the numeral 15.

Each crank 15 is provided with a split hub 16 projecting from one side thereof at one end. The hub end of the crank is keyed as at 17 to the shaft 14, and this key is fixed in position by a set screw 18. The split hub is clamped about a shaft 14 by a heavy bolt 19.

In the other end of the crank is formed a tapered opening 22 decreasing in diameter toward the side of the crank opposite the hub 16. An eccentric 23 is provided with an outer face corresponding in shape and size to the tapered opening 22 to fit therein as shown in Figure 2. When the parts are assembled, the face of the eccentric 23 opposite the hub 16 may be substantially flush with the corresponding face of the crank. The thickness of the eccentric 23 is substantially greater than the thickness of the crank 15, and the inner side of the eccentric, that is, the side toward the hub 16, is preferably grooved as at 26 to form a shoulder 27 having a purpose to be described.

The eccentric is provided preferably with a straight opening 30 in which is arranged a wrist pin 31 having a flange 32 limiting movement of the wrist pin through the eccentric. The opening 30 being straight, it is unnecessary to mount a nut on the inner end of the wrist pin, and, in practice, it has been found wholly practicable to retain the wrist pin in position by means of a simple snap ring 33 engaging in an annular groove 34 formed in the wrist pin.

Outwardly of the eccentric, a conventional bearing housing 35 is mounted on the wrist pin and has the usual roller bearings 36 therein and the usual upward radial projection 37 to which is connected the lower end of the associated pitman 38 through which movement is imparted from the crank 15 to the walking beam.

The axis of the wrist pin opening 30 obviously is to one side of the center of the eccentric, and toward the other side of such a center a relatively heavy pin 40 is driven into an opening 41 in the eccentric. This pin is for engagement with a suitable bar arranged between this pin and the housing 35 to facilitate the turning of the eccentric 23 in its opening 22, as further described below.

Retaining means are provided for limiting movement of the eccentric from the opening 22. At circumferentially spaced points around the opening 22, and preferably 90° apart, are arranged a plurality of bolts 45 extending through openings 46 in the crank 15. Each of these bolts has a head 47 engageable with the outer face of the crank 15, and on each of the bolts 47 at the opposite side of the crank is threaded a nut 48. These nuts are of a particular shape, as shown in Figures 3 and 5. Each nut is made of relatively heavy plate material and is widened circumferentially of the eccentric and provided with an arcuate inner face 49 fitting against the surface of the peripheral groove 26, as shown in Figure 5. It will be noted that the thickness of the eccentric between the shoulder 27 and the opposite face of the eccentric is less than the thickness of the crank, against the inner face of which the nuts 48 are engageable, as shown in Figure 4. With the nuts 48 tightened on the bolts 45, in the operation of the apparatus, therefore, there is a substantial space between the inner face of each nut 48 and the shoulder 27, for a purpose to be described.

A clamping plate in the form of a flat ring 52 is arranged against the nuts 48, as shown in Figure 4. The plate 52 is provided with a plurality of smooth openings 53 corresponding in position to and slidably receiving the threaded ends of the bolts 45. The clamping plate is retained in position by nuts 54 threaded on the bolts 45 as shown in Figure 4.

The clamping plate 52 is provided with a plurality of positioning pins 56 projecting therethrough and welded thereto as at 57. These pins have ends 58 projecting inwardly from the clamping plate, these ends being substantially conical, with rounded ends, as shown in Figures 4 and 6. The projecting ends 58 of the positioning pins are engageable in correspondingly located recesses 59 formed in the adjacent face of the eccentric, as shown in Figure 4.

*Operation*

Assuming that the parts are assembled as shown in Figures 1 and 2, the pumping operation may be performed in the usual manner and a maximum pumping stroke will be provided, since the wrist pin axis will be located at a maximum distance from the axis of the power shaft 14, as will become more apparent below.

Assuming that it is desired to change from the maximum pumping stroke to an intermediate stroke, the nuts 54 (Figure 4) will be backed off along the bolts 45 a distance greater than the depth of penetration of the pin ends 58 in the recesses. The nuts 48 will remain tightened, and it will become apparent that these nuts are never loosened for the purpose of adjusting the position of the eccentric. Upon the loosening of the nuts 54, the lower face of the eccentric, as viewed in Figures 2 and 4, may be tapped to loosen the engagement of the tapered faces 22 and 24. A bar is then inserted between the pin 40 and the bearing housing 35, and force is applied thereto to rotate the eccentric 23 through 90° in the present embodiment of the invention. This will move each of the pin ends 58 (Figure 6) into engagement with a next recess 59, whereupon the nuts 54 again will be tightened and the adjustment is completed.

Attention is invited to the fact that the tapering of the pin ends 58 facilitates the operation in two respects. When a rotational force is applied to the eccentric 23, movement of the eccentric will cam the pin ends 58 out of the recesses 59. In the second place, due to the tapering of the pins 58, the tightening of the nuts 54 is facilitated, since the pin ends 58 need not be in precise alignment with the openings 59 and their tapered formation will properly turn the eccentric to the exactly aligned position of the pins 56 with the recesses 59.

The same operation is performed for a minimum pumping stroke, the eccentric being turned through an additional 90° movement, or 180° from the position shown in Figures 1 and 2. Obviously the design may be such as to provide any desired three pumping strokes with the arrangement of parts shown. For example, the four positions of the eccentric 23, represented by the successive four turning movements of 90°, may provide one position for a 54 inch pumping stroke, two positions for a 64 inch stroke, and one position for a 74 inch stroke. The two intermediate positions, of course, will be represented by the positioning of the wrist pin above or below the center of the eccentric, as viewed in Figure 5. Obviously, also, the invention is not limited to three pumping strokes, and additional variations may be provided by increasing the numbers of the pins 56 and openings 59.

In the assembling of the parts, the eccentric 23 obviously will be inserted into the opening 22 from the inner face of the crank, whereupon the bolts 45 are inserted. The nuts 48 (Figure 3) are then spun down on the threaded ends of the bolts as far as possible and then, with the nuts 48 turned to the proper position for engagement with the recess wall 26, wrenches are applied to the bolt heads 47 to draw down the nuts 48 into tight engagement with the inner face of the crank. After the eccentric and the bolts 45 and nuts 48 have been thus assembled, they become permanent parts of the mechanism in the sense that they are never removed except for replacement or the like. The nuts 48 act as retaining members to limit movement of the eccentric when this member is tapped to loosen it from its tapered opening, the distance of movement of the eccentric transversely of the crank being limited by the distance between the shoulder 27 and the adjacent faces of the nuts 48. As a matter of fact, except for replacement or the like it is never necessary to remove the clamping ring 52, the nuts 54 being run out on the bolts 45 only to the extent necessary to free the pin ends 58 from the recesses 59 to permit rotation of the eccentric.

It will be apparent that the eccentric is effectively fixed against accidental rotation, even to a limited extent, during a pumping operation. The eccentric surfaces 22 and 24 are maintained in tight engagement with each other while the inner face of the clamping plate 52 tightly engages the adjacent face of the eccentric 23. Even more important, the projecting pin ends 58 engaging in the recesses 59 provide at a plurality of points a positive means for preventing any rotational movement of the eccentric 23. The pins 56, moreover, serve as indexing pins for exactly locating the eccentric at any desired pumping stroke position.

All of the foregoing results and functions are highly important in a practicable apparatus of this character, and yet it will be apparent that the structure is quite simple and economical to manufacture. All of the elements may be very quickly and easily assembled, and the simple operations necessary for providing different pumping strokes may be very quickly and easily carried out without the use of special tools. Only a suitable straight bar for engaging the pin 40 is necessary for the rotation of the eccentric, and only a conventional wrench is necessary for tightening the bolts 45 in the nuts 48 and for loosening and tightening the nuts 54.

I claim:

1. An adjustable crank structure comprising a crank having means at one end for connecting it to a rotary drive shaft and being provided at a point spaced from said means with a tapered opening, an eccentric fitting said opening and provided with a wrist pin mounting eccentric thereto, means securing said eccentric in said opening, and retaining means carried by said crank at the side thereof adjacent the larger end of said tapered opening and projecting inwardly beyond the periphery of said opening, said retaining means overlying and being spaced from a portion of said eccentric to limit movement thereof from said opening when said securing means is released.

2. An adjustable crank structure comprising a crank having means at one end for connecting it to a rotary drive shaft and being provided at a point spaced from said means with a tapered opening, an eccentric fitting said opening and provided with a wrist pin mounting eccentric thereto, means securing said eccentric in said opening, a plurality of retaining elements carried by the side of said crank adjacent the larger end of said tapered opening, said retaining elements being circumferentially spaced around said opening and projecting inwardly beyond the periphery thereof and overlying and spaced from portions of said eccentric to limit movement thereof from said opening when said securing means is released.

3. An adjustable crank structure comprising a crank having means at one end for connecting it to a rotary drive shaft and being provided at a point spaced from said means with a tapered opening, an eccentric fitting said opening and provided with a wrist pin mounting eccentric thereto, means securing said eccentric in said opening, retaining means arranged at the side of said crank adjacent the larger end of said tapered opening, and bolts projecting through said crank and threaded in said retaining means, said retaining means projecting radially inwardly of the periphery of said larger end of said tapered opening in overlying spaced relationship to a portion of said eccentric to limit movement of the latter from said tapered opening when said securing means is released.

4. A structure according to claim 3 wherein said securing means is carried by said bolts.

5. A structure according to claim 3 wherein said securing means comprises a plate having openings slidably receiving said bolts, and nuts arranged on said bolts for securing said plate in clamping relationship to said eccentric.

6. An adjustable crank structure comprising a crank having means at one end for connecting it to a rotary drive shaft and being provided adjacent the other end with a conical opening, an eccentric having a tapered periphery fitting such opening, a wrist pin fixed to said eccentric at a point spaced from the center thereof whereby rotation of said eccentric will vary the distance from said wrist pin to the axis of said drive shaft, a securing member, a plurality of bolts circumferentially spaced around said tapered opening and projecting slidably through said securing member, nuts on the ends of said bolts engageable with said securing member to fix it in clamping engagement with said eccentric, said securing member having projections on the face thereof adjacent said eccentric and said eccentric having recesses corresponding in position and shape to and receiving said projections, the loosening of said nuts releasing said securing member for movement away from said eccentric a distance sufficient to release said projections from said recesses, and retaining means threaded on said bolts in engagement with said side of said crank, said retaining means projecting inwardly of the periphery of said opening and overlying portions of said eccentric in spaced relation thereto to limit movement of said eccentric from said conical opening when said nuts are loosened and said securing member is moved outwardly from said eccentric.

7. A structure according to claim 6 wherein said retaining means comprises a plurality of retaining members each threaded on one of said bolts and held thereby in tight engagement with said side of said crank, said retaining members projecting inwardly of the periphery of said tapered opening and all overlying and spaced from a surface of said eccentric to limit movement of the latter from said opening when said nuts are loosened.

8. An adjustable crank structure comprising a crank having means at one end for fixing it to a rotary drive shaft and being provided adjacent its other end with a conical opening, an eccentric provided with a tapered peripheral surface fitting said opening, said eccentric having an opening therethrough eccentrically thereof, a wrist pin mounted in said last-named opening, said eccentric in the face thereof adjacent the larger end of said conical opening being provided with an annular groove forming an annular shoulder lying in a plane parallel to and spaced inwardly of the adjacent side of said crank, means for securing said eccentric in said tapered opening, and retaining means fixed against said side of said crank in overlying spaced relationship to said shoulder to limit movement of said eccentric from said tapered opening when said securing means is released.

9. An adjustable crank structure comprising a crank having means at one end for fixing it to a rotary drive shaft and being provided adjacent its other end with a conical opening, an eccentric provided with a tapered peripheral surface fitting said opening, said eccentric having an opening therethrough eccentrically thereof, a wrist pin mounted in said last-named opening, said eccentric in the face thereof adjacent the larger end of said conical opening being provided with an annular groove forming an annular shoulder lying in a plane parallel to and spaced inwardly of the adjacent side of said crank, means for securing said eccentric in said tapered opening, a bolt projecting through said crank adjacent said tapered opening, and a retaining element threaded on said bolt and engaged against said side of said crank and arranged in overlying spaced relationship to said shoulder to limit movement of said eccentric from said tapered opening when said securing means is released from said eccentric.

10. An adjustable crank structure comprising a crank having means at one end for fixing it to a rotary drive shaft and being provided adjacent its other end with a conical opening, an eccentric provided with a tapered peripheral surface fitting said opening, said eccentric having an opening therethrough eccentrically thereof, a wrist pin mounted in said last-named opening, said eccentric in the face thereof adjacent the larger end of said conical opening being provided with an annular groove forming an annular shoulder lying in a plane parallel to and spaced inwardly of the adjacent side of said crank, means for securing said eccentric in said tapered opening, a plurality of bolts projecting through said crank and circumferentially spaced around said tapered opening, and a retaining member threaded on each of said bolts and engaging said side of said crank, each retaining member having an arcuate face engaging said annular groove and having its portion adjacent said arcuate face overlying and spaced from said shoulder to limit movement of said eccentric from said tapered opening when said securing means is released.

11. A structure according to claim 10 wherein said securing means is carried by said bolts, there being nuts threaded on said bolts to fix said securing means in position and said securing means being movable out of securing position upon the loosening of said nuts.

12. A structure according to claim 10 wherein said securing means comprises an annular plate having openings slidably receiving said bolts, and nuts threaded on said bolts to hold said securing means in securing position relative to said eccentric.

13. A structure according to claim 10 wherein said securing means comprises an annular plate having openings slidably receiving said bolts, and nuts threaded on said bolts to hold said securing means in securing position relative to said eccentric, said plate, when said nuts are tightened, lying against said retaining members, the face of said plate adjacent said eccentric having tapered projections and the adjacent face of said eccentric having correspondingly shaped and arranged recesses receiving said projections.

14. An adjustable crank structure comprising a crank having means at one end for fixing it to a rotary drive shaft and being provided adjacent its other end with a conical opening, an eccentric provided with a tapered peripheral surface fitting said opening, said eccentric having an opening therethrough eccentrically thereof, a wrist pin mounted in said last-named opening, a pitman bearing housing surrounding said wrist pin, a stationary pin carried by said eccentric at a point spaced from said bearing housing, the space between said stationary pin and said bearing housing being adapted for the reception therebetween of a bar to turn said eccentric, said wrist pin and said stationary pin being arranged at the side of said eccentric corresponding to the smaller end of said conical opening, retaining means fixed to the face of said crank corresponding to the larger end of said conical opening in overlying spaced relationship to a portion of said eccentric to limit movement thereof from said conical opening, and releasable means for fixing said eccentric in said conical opening.

References Cited in the file of this patent

UNITED STATES PATENTS

| 96,643 | Wanzer | Nov. 9, 1869 |
| 811,426 | Mitchell | Jan. 30, 1906 |
| 1,979,675 | Croom | Nov. 6, 1934 |
| 2,270,843 | Hartgering | Jan. 27, 1942 |
| 2,408,200 | De la Mater | Sept. 24, 1946 |
| 2,576,765 | Patterson | Nov. 27, 1951 |
| 2,618,172 | Shoup | Nov. 18, 1952 |

FOREIGN PATENTS

| 135,238 | Germany | Mar. 29, 1902 |
| 389,122 | Germany | Jan. 26, 1924 |